United States Patent [19]

Hatz

[11] 4,397,269

[45] Aug. 9, 1983

[54] INTERNAL COMBUSTION ENGINE WITH A CIRCULATING COOLING MEDIUM

[75] Inventor: Ernst Hatz, Ruhstorf, Fed. Rep. of Germany

[73] Assignee: Motorenfabrik Hatz GmbH & Co. KG, Ruhstorf, Fed. Rep. of Germany

[21] Appl. No.: 293,905

[22] Filed: Aug. 18, 1981

[30] Foreign Application Priority Data

Apr. 15, 1981 [DE] Fed. Rep. of Germany ....... 3115314

[51] Int. Cl.³ ............................................. F01P 11/08
[52] U.S. Cl. ............................ 123/41.33; 123/196 AB
[58] Field of Search ............... 123/41.31, 41.33, 41.42, 123/196 AB

[56] References Cited

U.S. PATENT DOCUMENTS

| | | | |
|---|---|---|---|
| 1,721,525 | 7/1929 | Mougey | 123/196 AB |
| 2,085,810 | 7/1937 | Ljungstrom | 123/41.42 |
| 2,507,643 | 5/1950 | Oaks | 123/41.33 |
| 4,264,826 | 4/1981 | Ullmann | 237/12.1 |

FOREIGN PATENT DOCUMENTS 276293 10/1927 United Kingdom .
1587696 4/1981 United Kingdom .

Primary Examiner—William A. Cuchlinski, Jr.
Attorney, Agent, or Firm—Flynn, Thiel, Boutell & Tanis

[57] ABSTRACT

An internal combustion engine has a reservoir containing oil which is circulated through passageways in the engine by an oil pump to lubricate and cool the engine. A tube has a spiral portion located in the reservoir and a cooling liquid, preferably water, is pumped through the tube to cool the heated oil in the reservoir. The water is thus heated and subsequently enters and discharges this heat in a heat receiver which is preferably part of a home-heating system. In a preferred embodiment, the heating system includes a heat pump which is operatively coupled to the heat receiver, the compressor of the heat pump being driven by the engine. In another preferred embodiment, a portion of the engine exhaust pipe extends through the reservoir so that heat from the gases passing through the pipe is at least partially transferred to the oil in the reservoir.

8 Claims, 3 Drawing Figures

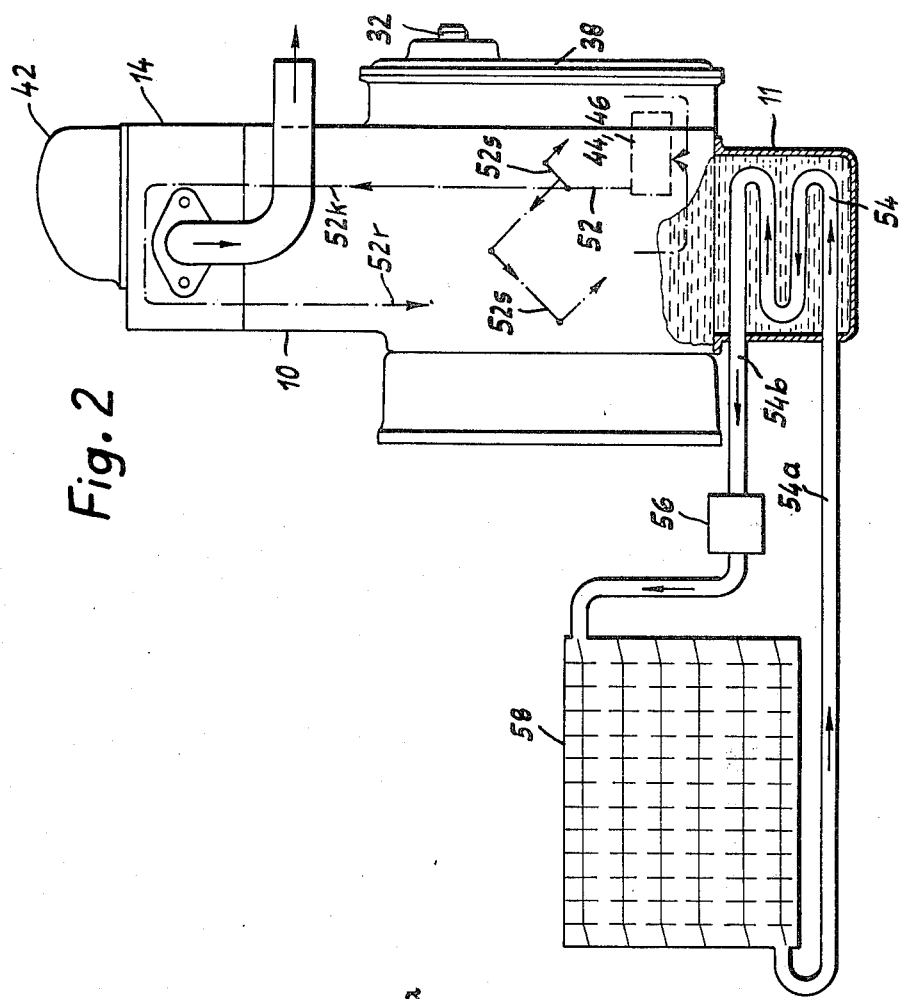
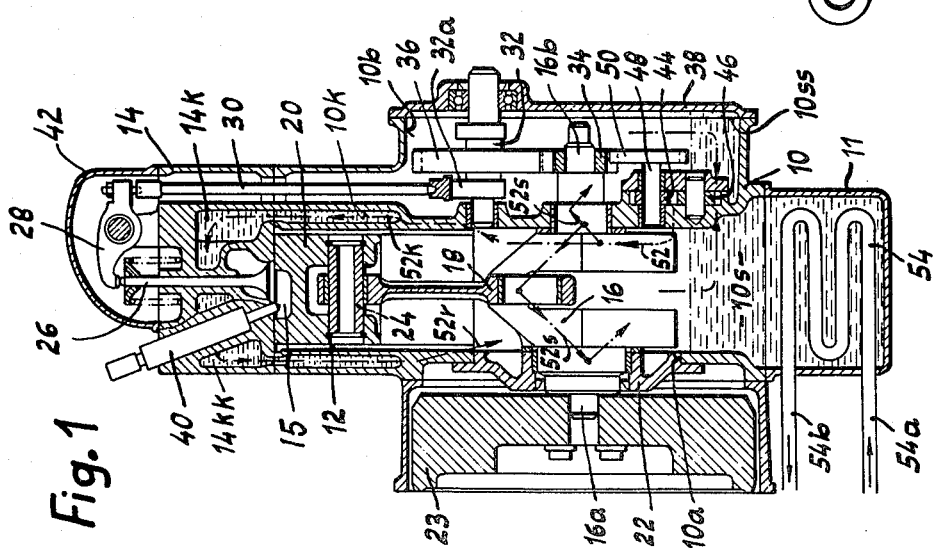

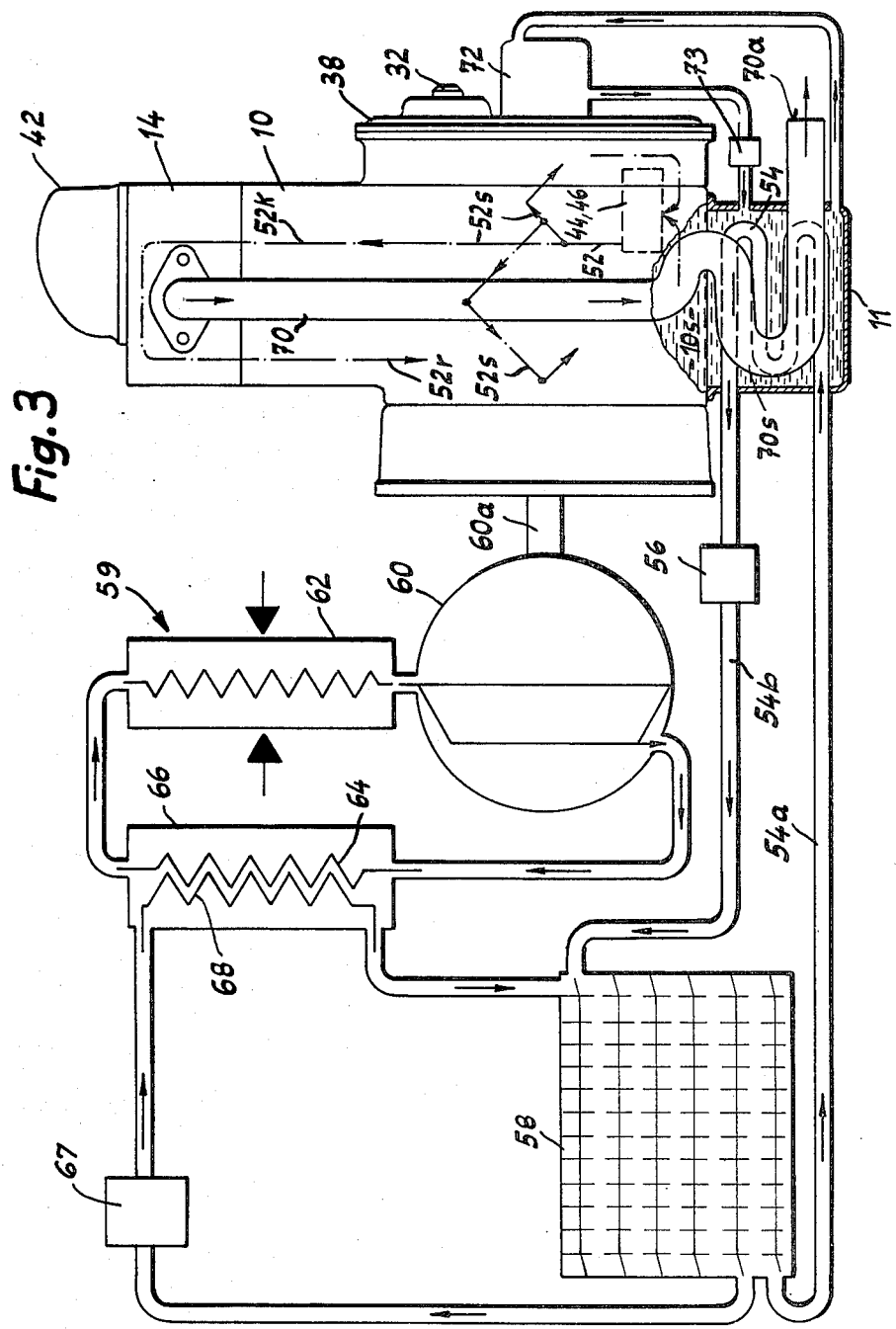

INTERNAL COMBUSTION ENGINE WITH A CIRCULATING COOLING MEDIUM

FIELD OF THE INVENTION

This invention relates to a system for cooling an internal combustion engine, the thermally stressed structural elements of which are cooled by means of a cooling medium circulated through the engine.

BACKGROUND OF THE INVENTION

Water is often used as an engine cooling medium. The designer thus intentionally accepts the fact that the structural elements of the engine must be protected against water influences like corrosion, calcium deposits and so forth. When using ocean water for circulation cooling of boat or ship motors, one must also accept the strong aggression of salt water against the surfaces to be cooled. To protect against such effects, one is forced to use resistant materials for the machine elements which come into contact with the sea water or to install sacrifice anodes which are short lived and therefore must frequently be replaced. A further, but very expensive, manner of achieving protection is the use of a two-circuit cooling system.

Measures of this type are very disadvantageous, however, because they require expensive materials or frequent replacement of parts, and therefore make the manufacture or maintenance of such internal combustion engines very expensive. A primary purpose of the present invention is to bring help here.

SUMMARY OF THE INVENTION

The objects and purposes of the invention are met by providing a system for cooling an internal combustion engine of the foregoing type in which the cooling of the machine structural elements is done completely with oil, whereby the cooling oil emits the absorbed heat into a heat exchanger.

In internal combustion engines having a lubricating oil which is circulated therein, there results a particularly advantageous simplification if, according to a further characteristic of the invention, the lubricating oil is also used as the cooling oil.

In internal combustion engines having lubricating oil, such oil is stored mostly in the lower area of the housing which, for this purpose, is constructed as a reservoir. According to a further development of the invention, it is advantageous to construct the reservoir as a heat exchanger in which transmission of heat from the oil to a cooling liquid occurs.

According to a different characteristic of the invention, it is advantageous to use water as the cooling liquid. This brings about the special advantage that one can use water without great cost as a heat-transporting means and can guide it to a heat receiver in which it emits the heat removed from the oil for a further application or use, such as for use in a house-heating system.

Internal combustion engines are also used for driving compressors in heat pumps, which in turn are used increasingly in heating systems in houses. It is hereby particularly advantageous to integrate the heat receiver which receives the heat from the water into the operating cycle of the fluid in the heat pump.

A further increase in the cooling and heat transfer and the utilization in an internal combustion engine is achieved according to a further development of the invention by at least partially transferring the heat of the engine exhaust gases to the cooling and lubricating oil in the heat exchanger.

In an internal combustion engine which, in addition to the heat pump compressor, also drives an aggregate which produces additional heat, there results a further advantageous development by introducing the additional heat into the cooling and lubricating oil in the heat exchanger. Through the subsequent heat exchange, it is then possible to also recover such additional heat for further utilization. As such additional aggregate, it is possible to provide a friction brake or a hydraulic brake.

BRIEF DESCRIPTION OF THE DRAWINGS

Exemplary embodiments of the invention are discussed in the following description in connection with the drawings, in which:

FIG. 1 is a sectional side view of a one-cylinder, oil-cooled internal combustion engine having a heat exchanger;

FIG. 2 illustrates the engine of FIG. 1 and a system which uses the heated engine oil for house heating; and FIG. 3 illustrates a second system which uses the heated engine oil for house heating and has a heat pump.

DETAILED DESCRIPTION

FIG. 1 illustrates a one-cylinder, internal combustion engine with fuel injection. The engine includes a housing 10, a combustion chamber 15 with a cylindrical sleeve 12 inserted therein, and a cylinder head 14 which is fixedly screwed to the top of the housing 10. A crankshaft 16 is rotatably supported in the housing 10 and is coupled to a connecting rod 18. A piston 20 is supported for reciprocal axial movement in the sleeve 12 and is pivotally connected to the connecting rod 18 by a pin 24. A cover 22 closes off a lateral opening 10a in the housing 10, which opening is provided for inserting the crankshaft 16 during assembly, and serves at the same time to support a main bearing for the crankshaft 16. A flywheel 23 is secured to a projecting end 16a of the crankshaft 16, which flywheel is used in a conventional manner for driving aggregates or the like.

The housing 10 opens downwardly into an upwardly opening oil sump 11 secured to the lower end of the housing 10. The space 10s in the lower area of the housing and in the oil sump 11 is filled with oil and serves as an oil reservoir.

Two valves 26, only one of which is illustrated, are arranged in the cylinder head 14 and respectively control the inlet and outlet of gases from the combustion chamber 15 in the cylindrical sleeve 12. The valves 26 are operated in a conventional manner by rocking levers 28 and rods 30, which in turn are operated by a rotationally supported cam shaft 32 having cams 32a thereon. To the end 16b of the crankshaft 16 is secured a gear 34 which engages a gear 36 on the cam shaft 32 and effects a driving of the valve control elements. A cover 38 closes off a lateral opening 10b in the housing 10 and also serves to support a bearing for the cam shaft 32.

A conventional fuel injection nozzle 40 is provided in the cylinder head 14 and takes care of introducing fuel into the combustion chamber 15 above the piston 20. The nozzle 40 is connected to an injection pump which is conventional and not illustrated. The rocking levers 28 are covered by a cover 42 which is secured on the cylinder head 14.

A gear conveying pump includes two engaging gear wheels 44 and 46, the wheel 44 being fixedly mounted on a shaft 48 having a gear 50 which engages the gear 34 on the crankshaft 16, thus effecting the drive of the conveying pump gears 44 and 46.

The lower space 10s in the housing 10 and sump 11 and the lower space 10ss between the housing 10 and the cover 38 are connected by a passageway, so that both spaces are filled with oil. The pump gears 44 and 46 suck in this oil and move it to various points in the engine for the purpose of lubrication. The construction of the lubricating oil passageways within the engine is generally known and is therefore not illustrated or described in detail. The oil-pressure supply passage from the pump gears 44 and 46 is thus indicated only schematically by dash-dotted lines identified with reference numeral 52.

Provided around the chamber 15 in the housing 10 is an annular cavity 10k which creates a fluid jacket around the chamber 15. Fluid flows in the cavity 10k only in the directions of the cylinder axis. The cavity 10k opens upwardly through the top of the housing 10 and communicates with the cavities 14k and 14kk in the cylinder head 14, which cavities are connected to each other by a passageway. The supply passage 52 from the oil-conveying pump gears 44 and 46 not only delivers the oil into the schematically indicated lubricating oil distribution passageways 52s for the bearing points of the crankshaft 16, but also through a passageway 52k to the fluid jacket 10k, where it cools the cylindrical sleeve 12 and the adjoining walls of the housing 10. The cooling oil then flows through the cavities 14k and 14kk of the cylinder head 14 in order to also cool the portions thereof which are thermally highly stressed (200°–250° C.). Through a return passage which leads downwardly from the annular cavity 10k, which is only schematically indicated and is identified with reference numeral 52r, the cooling oil returns to the reservoir 10s and 10ss.

The temperature of the oil is raised (to approximately 120° C.) by the heat absorbed by the oil as it runs through the lubricating and cooling system, and this heat is then emitted in the oil sump 11 which is designed as a heat exchanger. For this purpose, a heat exchanger spiral tube 54 is provided in the oil sump 11 and a suitable liquid cooling medium, for example cool water, is caused to flow through the spiral tube 54. The water, while flowing through the spiral tube 54, removes heat from the oil in the reservoir 10s. The water can, for example, be fed from any customary water source into a feed pipeline 54a and, after the heat exchange, can be fed through a discharge pipeline 54b to any suitable discharge place.

In this manner, the heat which the cooling and lubricating oil absorbs at thermally highly stressed locations during its flow through the passageways of the internal combustion engine is removed in the reservoir 10s with the help of the heat exchanger 11 and 54, so that it is cooled off (to approximately 90° C.) and is again ready for use in lubricating and cooling the engine.

The water which flows in the pipes of the heat exchanger does not contact any of the structural elements of the internal combustion engine. Thus, it is possible to use cold ocean or salt water for effecting the heat exchange without concern over the disadvantageous effects it would otherwise inflict on such structural elements.

In the exemplary embodiment according to FIG. 1, the heat absorbed from the cooling and lubricating oil by the water in the heat exchanger is discarded as useless with the cooling water discharged from the pipeline 54b. However, it is possible to usefully apply the heat obtained from the heat exchanger, as illustrated in the exemplary embodiment according to FIG. 2.

The internal combustion engine of FIG. 2 is structurally identical to the engine of FIG. 1. The water which flows out of the heat exchanger 11 and 54 in the outlet pipeline 54b and is heated up to approximately 80°–90° C. is fed by means of a conventional conveyor pump 56 to a conventional house-heating system 58 which is only schematically indicated and might, for example, be merely a hot water radiator. The water is cooled to approximately 60°–70° C. as it runs through the system 58, and then flows into and through the return pipeline 54a to the heat exchanger spiral tube 54 where it again absorbs heat from the oil in the reservoir 10s.

A further system utilizing the heat from the cooling and lubricating oil is illustrated in FIG. 3. Here the heat from the water is again supplied to the house-heating system 58 after the water runs through the heat exchanger spiral tube 54. In addition, a conventional heat pump 59 is connected to the system 58, for example a heat pump of the type described in U.S. Ser. No. 54 913, filed July 5, 1979 and entitled "HEAT SYSTEM WITH HEAT PUMP AND AUXILIARY HEATER", now U.S. Pat. No. 4,293,092 the disclosure of which is incorporated herein by reference. The compressor 60 of the heat pump 59 is driven by the internal combustion engine through a drive shaft 60a which is coupled to the crankshaft 16 of the machine. The path of the cooling medium conveyed by the compressor 60 includes an evaporator 62 in which the cooling medium vapor absorbs heat from the medium, for example air, which surrounds it. During compression, the cooling medium vapor is condensed in the compressor 60 and is thereby heated up, and then flows to and through a pipeline 64 in a condenser 66 which functions as a heat exchanger. Here, the heated-up cooling medium emits its heat to water conveyed by a conventional pump 67 through the heating system 58 and through the pipeline 68 in the condenser 66.

In this embodiment, the heating system 58 not only receives the heat which is obtained from the cooling and lubricating oil of the engine, but also the heat which is provided by the heat pump 59.

It is possible, if needed, to further increase the temperature of the cooling and lubricating oil in the collecting basin 10s so as to provide additional usable heat if, as illustrated in FIG. 3, a spiral-shaped portion 70s of the engine exhaust pipe 70 is guided through the oil in the reservoir 10s. The combustion exhaust gases then emit a considerable part of their heat to the oil in the reservoir 10s before they escape at the outlet 70a of the exhaust pipe 70.

Also, it is possible to associate a conventional hydraulic brake 72 with the end 16b of the crankshaft 16, which brake preferably includes a gear pump which conducts a portion of the oil from the reservoir 10s through the brake 72. While running through the brake, the temperature of the oil is additionally increased by heat generated by friction action within the brake. A regulator 73 is provided in the line returning oil from the brake 72 to the reservoir 10s to control the oil pressure in the brake 72.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An apparatus for removing heat from an internal combustion engine, comprising means defining a reservoir in said engine for holding oil for cooling said engine, means in said engine for circulating said cooling oil from said reservoir through said engine to absorb heat therefrom during operation thereof and for returning the heated cooling oil to said reservoir, heat exchanger means disposed in said reservoir and having a cooling fluid flowing therethrough, said heat exchanger means transferring heat from said cooling oil in said reservoir to said cooling fluid, and a heating system which is in fluid communication with said heat exchanger means and has said cooling fluid flowing therethrough, said engine having an exhaust pipe which passes through said oil reservoir, whereby heat from exhaust gases passing through the portion of said exhaust pipe in said reservoir is transferred to said cooling oil in said reservoir.

2. The apparatus according to claim 1, wherein said engine includes a housing and an oil sump disposed below said housing, wherein said heat exchanger means includes a spiral tube, and wherein said portion of said exhaust pipe within said reservoir is a spiral, said cooling oil flowing around said spiral tube and spiral exhaust pipe portion in contact therewith.

3. The apparatus according to claim 1, including a friction brake driven by said engine and means for transferring heat generated in said friction brake to said cooling oil in said reservoir.

4. The apparatus according to claim 1, wherein said heating system includes a compressor driven by said engine and in fluid communication with an evaporator and a condenser, said compressor, evaporator and condenser having a further cooling fluid flowing therethrough, said evaporator transferring heat from the ambient atmosphere to said further cooling fluid and said condenser transferring heat from said further cooling fluid to said first-mentioned cooling fluid.

5. The apparatus according to claim 4, wherein said first-mentioned and further cooling fluids are water, and including means for lubricating said engine with said cooling oil.

6. An apparatus for removing heat from an internal combustion engine which is adapted to drive a compressor for a heat pump in a heating system, comprising means defining a reservoir in said engine for holding oil for cooling said engine, means for circulating said cooling oil, means for transferring to said cooling oil substantially all heat generated during operation of said engine, including frictional heat produced by moving engine parts and heat from waste combustion gases, and a single heat exchanger means for transferring heat from said cooling oil in said reservoir to a heat transferring medium flowing through said heating system, wherein said engine includes a housing and said oil reservoir is disposed below said housing, wherein said engine includes an exhaust pipe for waste combustion gases which passes through said oil reservoir, wherein said heat exchanger means includes a spiral tube, said heat transferring medium flowing through said spiral tube, and wherein a portion of said exhaust pipe within said reservoir is a spiral, said cooling oil flowing around said spiral tube and spiral exhaust pipe portion in contact therewith.

7. The apparatus according to claim 6, including a friction brake driven by said engine and means for transferring heat generated in said friction brake to said cooling oil in said reservoir.

8. The apparatus according to claim 7, wherein said heat transferring medium in said spiral tube is water, and including means for lubricating said engine with said cooling oil.

* * * * *

UNITED STATES PATENT AND TRADEMARK OFFICE
CERTIFICATE OF CORRECTION

PATENT NO. : 4 397 269
DATED : August 9, 1983
INVENTOR(S) : Ernst Hatz

It is certified that error appears in the above-identified patent and that said Letters Patent is hereby corrected as shown below:

Col. 6, line 36; change "claim 7" to ---claim 6---.

Signed and Sealed this

Eighteenth Day of October 1983

[SEAL]

Attest:

GERALD J. MOSSINGHOFF

Attesting Officer     Commissioner of Patents and Trademarks